United States Patent

[11] 3,608,607

| [72] | Inventor | Gerhart L. Gerbeth<br>Akron, Ohio |
|---|---|---|
| [21] | Appl. No. | 855,962 |
| [22] | Filed | Sept. 8, 1969 |
| [45] | Patented | Sept. 28, 1971 |
| [73] | Assignee | The Goodyear Tire & Rubber Company<br>Akron, Ohio |

[54] WHEEL RIM WITH SIDE RING CONNECTOR
10 Claims, 9 Drawing Figs.

[52] U.S. Cl. .................................................. 152/410
[51] Int. Cl. ................................................ B60b 25/20
[50] Field of Search .......................................... 70/58;
24/263 DT, 263 FC, 122.6; 292/DIG. 33, 253,
307, 256.65; 152/401, 407, 406–410; 220/38.5

[56] References Cited
UNITED STATES PATENTS

| 844,321 | 2/1907 | Boyer | 292/307 |
|---|---|---|---|
| 2,178,502 | 10/1939 | Stone | 152/407 |
| 2,822,017 | 2/1958 | Herzegh | 152/406 |
| 3,164,194 | 1/1965 | Diaz | 152/407 |

*Primary Examiner*—Arthur L. La Point
*Assistant Examiner*—Richard A. Bertsch
*Attorneys*—F. W. Brunner and Paul E. Milliken

ABSTRACT: A wheel rim for use with pneumatic tires. The rim has a split side ring, the ends of which are connected together by a short length of flexible cable attached to each opposed end to prevent the side ring from coming off the rim base due to radial expansion of the ring.

PATENTED SEP28 1971

INVENTOR.
GERHART L. GERBETH

BY

ATTORNEY

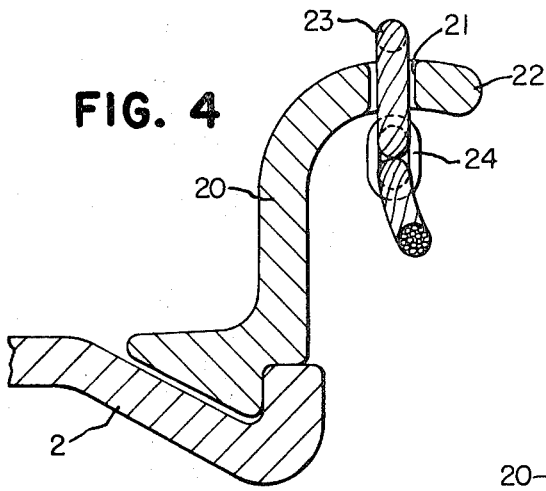
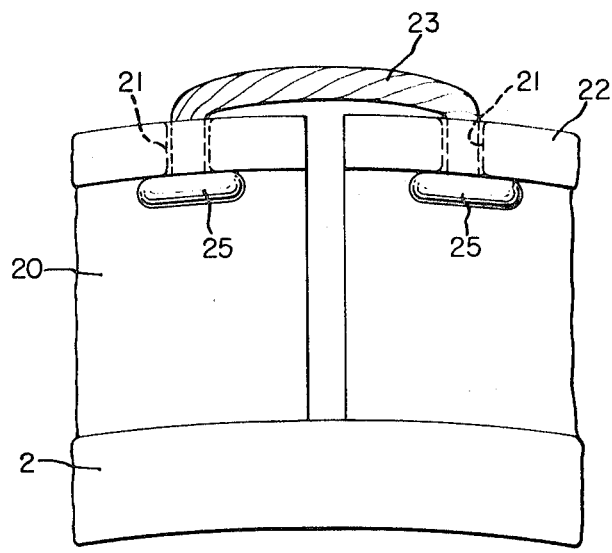
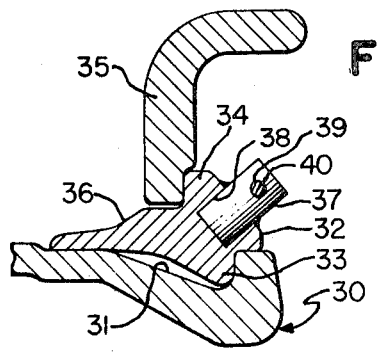
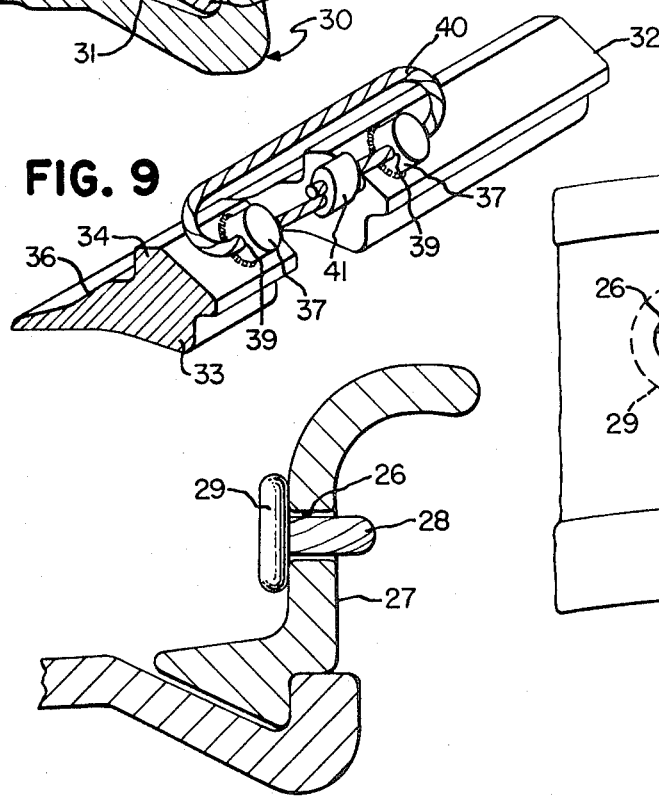
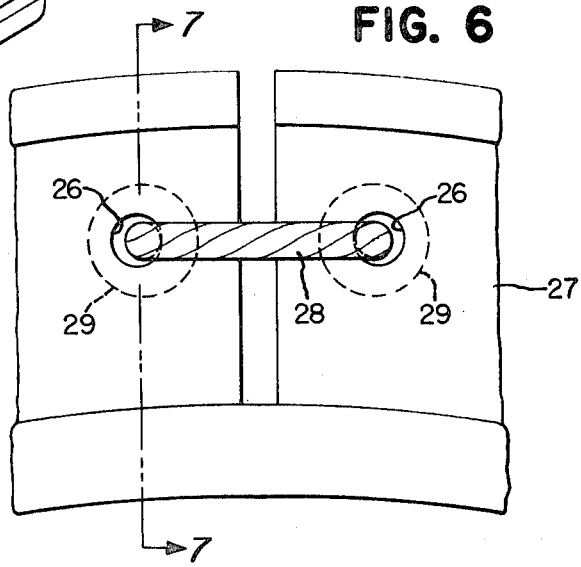

WHEEL RIM WITH SIDE RING CONNECTOR

This invention relates to a wheel rim for carrying a pneumatic tire such as is normally used on trucks or busses. The invention relates particularly to the use of a flexible cable connecting together the two opposed ends of the split side ring.

BACKGROUND OF THE INVENTION

In the past, larger vehicles such as trucks, busses and the like, have required the use of a multipiece rim to facilitate changing of the tires which have a heavier bead than those used on smaller automotive vehicles and which cannot be stretched over the side flange of the rim. One type of rim commonly used in the past has been a two-piece rim having an integral side flange on one side and a removable split side ring on the opposite lateral side of the rim. On such a rim, a radially inwardly extending portion of the side ring would engage a radially outwardly facing gutter or channel which would retain the side ring and prevent it from moving axially off the rim base. One problem encountered with this type of rim, however, is that under certain circumstances, particularly when a flat tire occurs and when the vehicle is running on the rim, the side ring may expand radially outwardly a sufficient amount to jump out of the gutter and move axially outwardly off the bead seat band. It has been found necessary to correct this problem by providing a connection between the two opposed ends of the split side ring to prevent the side ring from expanding radially and circumferentially a sufficient amount to come off the rim base. It has been found, however, that if the connection between the two ends of the side ring is rigid, the axial and circumferential flexing of the side ring will either break off the connector or will create undesirable stresses in the side ring itself.

OBJECTS OF THE INVENTION

A primary object of this invention is to provide a flexible connector for limiting the radial and circumferential expansion of a split side ring of a wheel rim to prevent the side ring from coming off the rim base while permitting normal flexing of the side ring. Another object of this invention is to provide a connector which is simple, inexpensive and easy to connect and disconnect from the side ring.

These and other objects will become more fully apparent as the description proceeds in the following specification and the accompanying drawings.

BRIEF DESCRIPTION OF THE DRAWINGS

FIG. 4 is a cross-sectional view taken on line 4—4 of FIG. 3;

FIG. 5 is a fragmentary side view similar to FIG. 3 but showing another embodiment of the invention;

FIG. 6 is a fragmentary side view showing another embodiment of the invention;

FIG. 7 is a cross-sectional view taken on line 7—7 of FIG. 6;

FIG. 8 is a cross-sectional view through a wheel rim showing another embodiment of the invention; and FIG. 9 is a fragmentary perspective view of the split lock ring shown in FIG. 8.

DESCRIPTION OF THE PREFERRED EMBODIMENTS

Figure 1:
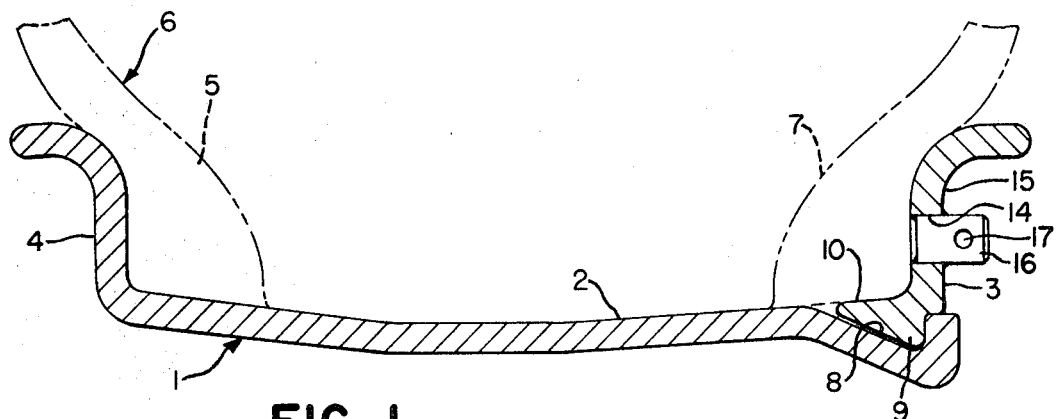
FIG. 1 is a cross-sectional view through a wheel rim of the type utilizing the present invention.
Figure 2:
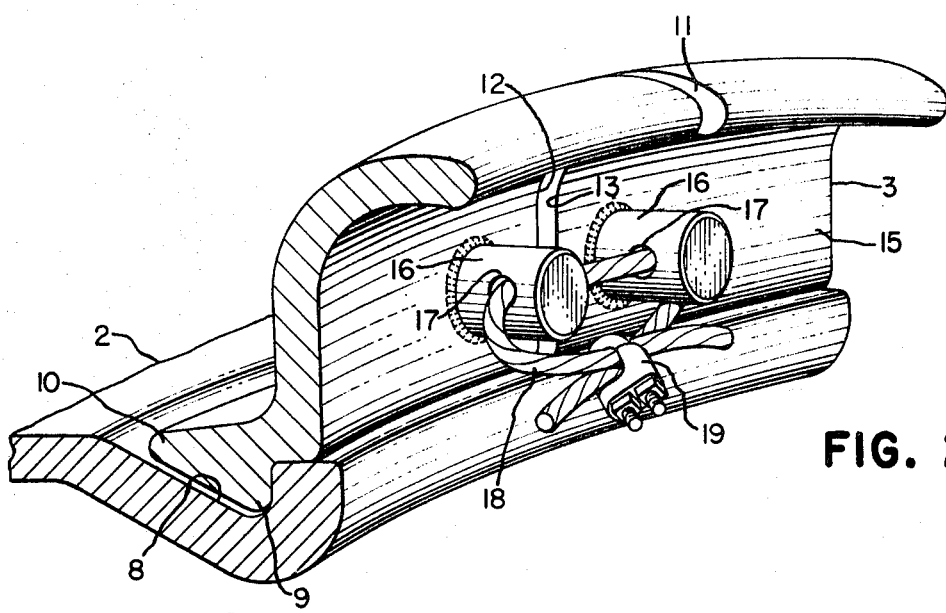
FIG. 2 is a fragmentary perspective view showing one embodiment of the invention.

Referring now to FIGS. 1 and 2 of the drawings, a wheel rim assembly is indicated generally by the numeral 1 which is comprised of an endless annular rim base 2 and a split side ring 3. The rim base 2 has an integral radially outwardly extending side flange 4 for retaining one bead 5 of a tire 6. The opposite bead 7 of the tire 6 is retained by the split side ring 3. The rim base 2 has a radially outwardly extending gutter 8 on the side opposite the side flange 4. The split side ring 3 has a radially inwardly extending portion 9 which engages the gutter 8 and retains the side ring on the rim base 2 when the tire 6 is assembled thereon. The side ring 3 also has an axially inwardly extending portion 10. The rim 1, as illustrated in FIG. 1, is for use with a tub-type tire; however, the inner tube has not been shown in the drawings since it does not relate to the invention. The invention may also be used on rims for tubeless tires.

FIG. 2 illustrates the portion of the side ring having a radial split 11 therethrough lying between opposed ends 12 and 13 of the side ring 3. Adjacent each of the ends 12 and 13, a transverse hole 14 is drilled or punched through the radial sidewall portion 15 of the side ring 3. A pin 16 is fastened into each of the holes 14, preferably by welding, so that each pin protrudes a short distance outwardly from the side ring 3. Each pin 16 has a transverse hole 17 therethrough. A flexible cable 18, preferably of corrosion-resistant metal, is passed through each of the holes 17 and then the ends of the cable are clamped together by a suitable clamp 19. It may be seen that so long as the cable 18 is sufficiently tightened before being clamped, it will limit the radial and circumferential expansion of the side ring 3. At the same time, the flexible cable will permit flexing of both the cable and the side ring 3 without creation of any undesirable stresses. The retaining cable 18 is particularly useful when a flat tire occurs and there is a tendency for the side ring 3 to come off the rim base 2 when the vehicle is running on the rim.

Figure 3:
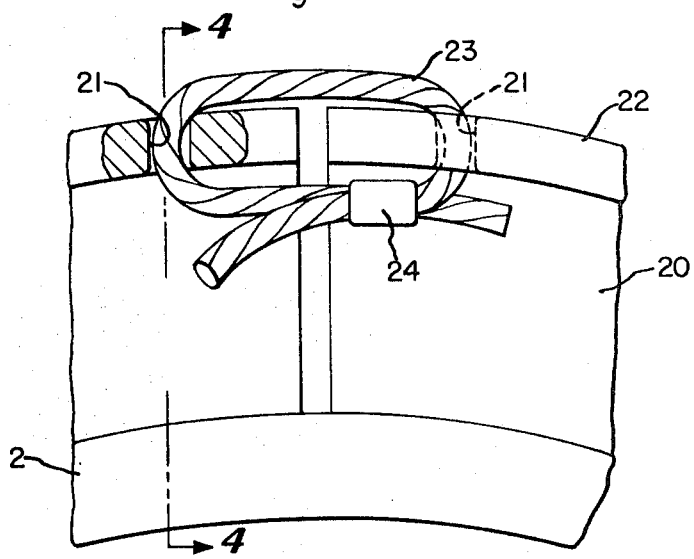
FIG. 3 is a fragmentary side view showing another embodiment of the invention.

Referring now to FIGS. 3 and 4 which show an identical rim base 2 and a split side ring 20 similar to the side ring 3, the side ring 20 is curved axially outwardly at its outer tip and has a pair transverse holes 21 drilled or punched through the axially outwardly extending lip portion 22. A cable 23 is passed through the two holes 21 and clamped by a suitable clamp 24. The cable 23 performs the same function as that shown in FIGS. 1 and 2 with the only difference being that the cable 23 is connected directly through holes 21 in the side ring rather than being connected through holes in the pins 16.

FIG. 5 shows an identical side ring 20 with the holes 21 the same as that shown in FIGS. 3 and 4. The cable 23, however, instead of being clamped by a clamp such as 24, is fastened by a pair of buttons 25 which are crimped or otherwise suitably securely fastened to each end of the cable 23 after it is passed through the hole 21.

FIGS. 6 and 7 show still another embodiment of the invention wherein a pair of holes 26 are drilled adjacent the ends of a side ring 27. A cable 28 is passed through the holes 26 and is secured on the axially inner side of the side ring 27 by buttons 29 similar to the buttons 25 described above.

FIG. 8 shows the gutter edge portion of a wheel rim 30 having an annular gutter 31 which receives a transversely split lock ring 32 having a radially inwardly extending gutter engaging flange 33, an integral radially outwardly extending flange 34 which retains an endless side ring 35 and an axially inwardly extending bead seat portion 36. Each adjacent end of the split lock ring 32 has a pin 37 fastened thereto as shown in FIG. 9. Each pin 37 may be inserted in a hole 38 (FIG. 8) and secured by welding or other suitable means. Each pin 37 has a transverse hole 39 therethrough for receiving a cable 40 as shown in FIG. 9. The free ends of the cable 40 are fastened together by a clamp 41. The cable 40 will thus retain the lock ring 32 in the gutter 31 in the same manner as the split side rings 3, 20 and 27 previously described.

It will be obvious that there are various means of attaching the cable and there are various positions near the ends of the side ring where the cable may be attached. It is also obvious that when pins are used, such as those shown in FIGS. 1 and 2, they may be attached in ways other than welding. Various modifications may be made without departing from the scope of the invention so long as a flexible connecting member is securely joined to each opposed end of the split side ring in such manner to prevent it expanding a sufficient distance to permit the side ring to become disengaged from the gutter portion and slide axially off the rim base.

What is claimed is:

1. A wheel rim for carrying a pneumatic tire thereon comprising:
   A. a substantially cylindrical endless rim base;
   B. an endless tire bead retaining flange along one edge of the rim base;
   C. a radially outwardly facing annular gutter formed adjacent the opposite edge of the rim base;
   D. a transversely split side ring for retaining the opposite bead of the tire to that retained by the retaining flange, said side ring comprising
      1. a gutter engaging portion extending radially inwardly into the gutter,
      2. an annular radially outwardly extending side flange integral with the gutter engaging portion: and
   E. flexible cable means attached to both opposed ends of the split side ring and joining together to prevent said ends of the side ring from moving circumferentially away from each other a distance sufficient to increase its diameter to a size which will permit it to disengage from the gutter and move laterally outwardly off the bead seat band, said flexible cable means being so mounted that the ends of the side ring may move both laterally and radially with respect to each other when the side ring is subjected to flexing caused by dynamic lateral and radial loads which occur when the wheel rim is used on a moving vehicle.

2. A wheel rim as claimed in claim 1 wherein the flexible cable means is a high strength corrosion resistant material.

3. A wheel rim as claimed in claim 1 wherein a pair of axially outwardly extending pins are fastened to the side ring with each pin being positioned adjacent one of the opposed ends thereof and each pin has a transverse hole therethrough with a flexible cable passing through each hole, said cable being secured to prevent it from pulling out of the holes.

4. A wheel rim as claimed in claim 1 wherein he side ring has a transverse hole therethrough adjacent each opposed end thereof and a flexible cable passes through both holes and is secured to limit the radial expansion of the side ring.

5. A wheel rim as claimed in claim 4 wherein the cable is secured in the holes by means of buttons fastened to each end of the cable, said buttons being positioned on the axially inner side of the side ring.

6. A wheel rim as claimed in claim 4 wherein the side flange curves axially outwardly at the outer tip thereof and the holes are positioned adjacent the outer tip.

7. A wheel rim as claimed in claim 4 wherein the cable is secured by clamping both ends of the cable to each other.

8. A wheel rim for carrying a pneumatic tire thereon comprising:
   A. a substantially cylindrical endless rim base;
   B. an endless tire bead retaining flange along one edge of the rim base;
   C. a radially outwardly facing annular gutter formed adjacent the opposite edge of the rim base;
   D. an endless side ring for retaining the opposite bead of the tire to that retained by the retaining flange;
   E. a split lock ring for retaining the side ring on the rim base, said lock ring comprising:
      1. a gutter engaging portion extending radially inwardly into the gutter,
      2. an annular radially outwardly extending flange integral with the gutter engaging portion for engaging the side ring; and
   F. flexible cable means attached to both opposed ends of the split lock ring and joining together the opposed ends to prevent said ends of the lock ring from moving circumferentially away from each other a distance sufficient to increase its diameter to a size which will permit it to disengage from the gutter and move laterally outwardly off the bead seat band, said flexible cable means being so mounted that the ends of the lock ring may move both laterally and radially with respect to each other when the lock ring is subjected to flexing caused by dynamic lateral and radial loads which occur when the wheel rim is used on a moving vehicle.

9. A wheel rim as claimed in claim 8 wherein the flexible connector means is a high strength corrosion resistant cable attached to the lock ring adjacent each end thereof.

10. A wheel rim as claimed in claim 8 wherein a pair of axially outwardly extending pins are fastened to the lock ring with each pin being positioned adjacent one of the opposed ends thereof and each pin has a transverse hole therethrough with a flexible cable passing through each hole, said cable being secured to prevent it from pulling out of the holes.

UNITED STATES PATENT OFFICE
CERTIFICATE OF CORRECTION

Patent No. 3,608,607   Dated September 28, 1971

Inventor(s) Gerhart L Gerbeth

It is certified that error appears in the above-identified patent and that said Letters Patent are hereby corrected as shown below:

Column 2, line 6, "tub-type" should read --tube-type--.

Column 3, line 16, after "together" insert --the opposed ends--.

Column 4, line 35, delete "connector" and insert --cable-- in its place; after "resistant" delete "cable" and insert --material-- in its place;

line 36, delete entire line.

Signed and sealed this 4th day of April 1972.

(SEAL)
Attest:

EDWARD M. FLETCHER, JR.
Attesting Officer

ROBERT GOTTSCHALK
Commissioner of Patents